(12) United States Patent
Jeon et al.

(10) Patent No.: US 10,264,240 B2
(45) Date of Patent: Apr. 16, 2019

(54) METHOD AND APPARATUS FOR GENERATING DEPTH IMAGE

(71) Applicant: SAMSUNG ELECTRONICS CO., LTD., Suwon-si (KR)

(72) Inventors: Myungjae Jeon, Yongin-si (KR); Yonghwa Park, Yongin-si (KR); Jangwoo You, Seoul (KR); Yongchul Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 15/196,710

(22) Filed: Jun. 29, 2016

(65) Prior Publication Data
US 2017/0127047 A1    May 4, 2017

(30) Foreign Application Priority Data
Oct. 28, 2015 (KR) .......................... 10-2015-0150476

(51) Int. Cl.
*H04N 13/02* (2006.01)
*G01S 17/08* (2006.01)
(Continued)

(52) U.S. Cl.
CPC ......... *H04N 13/271* (2018.05); *G01S 7/4816* (2013.01); *G01S 7/497* (2013.01);
(Continued)

(58) Field of Classification Search
CPC ........... H04N 13/0271; H04N 13/0253; H04N 13/0207; H04N 13/0296; G01S 17/89; G01S 17/08

USPC .......................................................... 348/46
See application file for complete search history.

(56) References Cited

U.S. PATENT DOCUMENTS 8,766,552 B2   7/2014  Lee et al.
9,207,065 B2   12/2015 Kim et al.
(Continued)

FOREIGN PATENT DOCUMENTS

EP  1944622 A1  7/2008
EP  3021138 A1  5/2016
(Continued)

OTHER PUBLICATIONS

Communication dated Mar. 22, 2017, issued by the European Patent Office in counterpart European Patent Application No. 16194853.4.

*Primary Examiner* — Hee-Yong Kim
(74) *Attorney, Agent, or Firm* — Sughrue Mion, PLLC

(57) ABSTRACT

A depth image generating apparatus includes a light source configured to emit light; an optical shutter provided on a path of the light reflected by an object and configured to modulate a waveform of the reflected light by changing a transmissivity of the optical shutter with respect to the reflected light; a driver configured to apply a driving voltage to the light source and a driving voltage to the optical shutter; a temperature measurer configured to measure a temperature of the optical shutter; a controller configured to control driving voltages; and a depth information obtainer configured to generate an image corresponding to the reflected light that passes through the optical shutter, extract a phase difference between a phase of the light emitted by the light source to the object and a phase of the reflected light, and obtain depth information regarding the object based on the phase difference.

31 Claims, 14 Drawing Sheets

(51) Int. Cl.
    *G01S 17/89*        (2006.01)
    *H04N 13/271*       (2018.01)
    *H04N 13/207*       (2018.01)
    *H04N 13/254*       (2018.01)
    *H04N 13/296*       (2018.01)
    *G01S 17/36*        (2006.01)
    *G01S 7/481*        (2006.01)
    *G01S 7/497*        (2006.01)

(52) U.S. Cl.
    CPC .............. *G01S 17/08* (2013.01); *G01S 17/36*
        (2013.01); *G01S 17/89* (2013.01); *H04N*
        *13/207* (2018.05); *H04N 13/254* (2018.05);
        *H04N 13/296* (2018.05)

(56) References Cited

U.S. PATENT DOCUMENTS

| | | |
|---|---|---|
| 2006/0280505 A1 | 12/2006 | Varshneya et al. |
| 2009/0116850 A1 | 5/2009 | Maryfield |
| 2009/0220256 A1* | 9/2009 | Suhara ............... G03G 15/5037 399/32 |
| 2013/0021325 A1* | 1/2013 | Kim .................... G02B 27/2264 345/419 |
| 2013/0050426 A1* | 2/2013 | Sarmast ................... G01S 17/89 348/46 |
| 2013/0242128 A1 | 9/2013 | Ishihama et al. |
| 2014/0098192 A1* | 4/2014 | Park ........................ G01S 17/08 348/46 |
| 2010/0347445 | 11/2014 | Yoon et al. |

FOREIGN PATENT DOCUMENTS

| | | |
|---|---|---|
| JP | 2008-58882 A | 3/2008 |
| JP | 2012-120764 A | 6/2012 |
| KR | 10-2012-0025858 A | 3/2012 |
| KR | 10-2013-0114032 A | 10/2013 |
| WO | 2010/076775 A2 | 7/2010 |
| WO | 2010/076775 A3 | 7/2010 |

\* cited by examiner

METHOD AND APPARATUS FOR GENERATING DEPTH IMAGE

CROSS-REFERENCE TO RELATED APPLICATION

This application claims priority from Korean Patent Application No. 10-2015-0150476, filed on Oct. 28, 2015 in the Korean Intellectual Property Office, the disclosure of which is incorporated herein in its entirety by reference.

BACKGROUND

1. Field

Methods and apparatuses consistent with exemplary embodiments disclosed herein relate to generating depth images.

2. Description of the Related Art

Recently, research on three-dimensional (3D) cameras, motion sensors, and laser radars (LADARs) capable of obtaining information about distances to certain objects have increased. Particularly, as 3D display apparatuses capable of displaying depth images have been developed and demand therefor has increased, the importance of 3D content has also increased. Therefore, various 3D image generating apparatuses enabling users to create 3D content have been researched.

Depth information regarding distances between surfaces of an object and a 3D image generating apparatus may be obtained by using a stereo vision technique using two cameras or a triangulation technique using structured light and a camera. However, the accuracy of depth information obtained by using such techniques rapidly deteriorates as a distance to an object increases. Also, since these techniques are dependent on the surface conditions of the object, it is difficult to obtain precise depth information.

To overcome such problems, a time-of-flight (TOF) technique has been introduced. In the TOF technique, a light beam is emitted to an object and a time of flight of the light beam reflected by the object and received by a light receiving unit is measured. The TOF technique includes a series of light processing operations for extracting depth information, the operations including emitting a light beam having a particular wavelength (e.g., a near-infrared ray having the wavelength of 850 nm) from an illumination optical system including a light-emitting diode (LED) or a laser diode (LD), receiving, at a light receiver, a reflected light beam that has the same wavelength as the emitted light bean and is reflected by the object, and modulating the received light beam via an optical shutter that has a gain waveform known in the art. Various TOF techniques have being developed based on these light processing operations.

SUMMARY

Exemplary embodiments provide methods and apparatuses for efficiently controlling operations of an optical shutter and a light source in a time-of-flight (TOF) technique.

According to an aspect of an exemplary embodiment, there is provided a depth image generating apparatus including: a light source configured to emit light towards an object so that the light is reflected by the object; an optical shutter provided on a path of the light reflected by the object and configured to modulate a waveform of the reflected light by changing a transmissivity of the optical shutter with respect to the reflected light; a driver configured to apply a driving voltage to the light source and a driving voltage to the optical shutter; a temperature measurer configured to measure a temperature of the optical shutter; a controller configured to control a driving voltage applied to the driver based on the temperature measured by the temperature measurer; and a depth information obtainer configured to generate an image corresponding to the reflected light that passes through the optical shutter, extract a phase difference between a phase of the light emitted by the light source to the object and a phase of the reflected light, and obtain depth information regarding the object based on the phase difference.

The driver may be further configured to change the transmissivity of the optical shutter by changing the driving voltage applied by the driver to the optical shutter.

The driver may be further configured to oscillate the driving voltage applied to the optical shutter around a bias voltage.

The controller may be further configured to control the bias voltage based on the temperature measured by the depth information obtainer.

The controller may be further configured to control an amplitude of the driving voltage applied to the optical shutter based on the temperature measured by the temperature measurer.

The driver may be further configured to change at least one of a wavelength and an intensity of the light emitted towards the object by changing the driving voltage applied to the light source.

The controller may be further configured to control the driver to change a size of the driving voltage applied to the light source according to the depth information regarding the object obtained by the depth information obtainer.

The depth image generating apparatus may further include a lookup table including control variables for controlling the driver, the lookup table being embedded in the controller.

The control variables may be determined by a plurality of sampling points based on the temperature of the optical shutter and the distance between the object and the light source.

The control variables may include a bias voltage regarding the driving voltage of the optical shutter.

The driver may be further configured to oscillate the driving voltage applied to the optical shutter around the bias voltage.

The control variables may include an amplitude of the driving voltage applied to the optical shutter.

The control variables may include a size of the driving voltage applied to the light source.

The control variables may include a correction value for correcting the depth information regarding the object obtained by the depth information obtainer, the correction value being determined based on operation characteristics of the optical shutter, and the depth information obtainer may be configured to correct the depth information regarding the object based on the correction value.

The depth image generating apparatus may further include an operation time measurer configured to measure accumulated operation times of the optical shutter and the light source, and the control variables may change in correspondence to the accumulated operation times.

The light source may be further configured to sequentially emit a plurality of light beams towards the object at predetermined intervals, and the depth information obtainer may be further configured to measure intensities of reflected light beams formed as the plurality of light beams are reflected by the object and modulated as the reflected light beams pass through a light modulator, and to extract a difference between a phase of the light emitted by the light source and phases of the reflected light beams.

According to an aspect of another exemplary embodiment, there is provided a method of generating a lookup table for controlling a depth image generating apparatus according to a temperature of an optical shutter of the depth image generating apparatus and a distance between a light source of the depth image generating apparatus and an object which reflects light emitted by the light source, the method including: determining a plurality of sampling points in correspondence to the temperature of the optical shutter and the distance between the light source of the depth image generating apparatus and the object; and determining control variables for a depth image determining operation to be performed by the depth image generating apparatus by repeatedly measuring depth information regarding the object with respect to each of the plurality of sampling points.

The control variables may include a bias voltage regarding a driving voltage of the optical shutter.

The control variables may include an amplitude of the driving voltage of the optical shutter, and the driving voltage may oscillate around the bias voltage.

The control variables may include a size of a driving voltage applied to the light source.

The determining of the control variables may include repeatedly measuring the depth information regarding the object at each of the sampling points by changing the control variables and determining the control variables corresponding to a smallest deviation of the measured depth information as the control variables for the depth image determining operation to be performed by the depth image generating apparatus.

The method may further include storing changed values of the control variables corresponding to the respective sampling points according to accumulated operation times of the optical shutter and the light source.

According to an aspect of another exemplary embodiment, there is provided a method of generating a depth image, the method including: emitting light toward an object by using a light source so that the light is reflected by the object; modulating a waveform of the light reflected by the object by changing a transmissivity of the reflected light by using an optical shutter; measuring a temperature of the optical shutter; controlling a driving voltage applied to the optical shutter and a driving voltage applied to the light source based on the temperature of the optical shutter; extracting a phase difference between a phase of the light emitted by the light source towards the object and a phase of the reflected light by measuring an intensity of the reflected light that passes through the optical shutter; and obtaining depth information regarding the object based on the phase difference.

The method may further include oscillating, by a driver, the driving voltage applied to the optical shutter around a bias voltage.

The controlling of the driving voltages may include controlling the bias voltage and an amplitude of the driving voltage based on the temperature of the optical shutter measured by a temperature measurer.

The controlling of the driving voltages may include controlling the driver to change a size of the driving voltage applied to the light source according to the depth information.

The controlling of the driving voltages may include: invoking, from a lookup table, control variables for controlling the driving voltages; and controlling the driving voltages based on the control variables.

The method may further include storing the control variables in the lookup table, and the control variables may be determined by a plurality of sampling points based on the temperature of the optical shutter and a distance between the object and the light source.

The method may further include measuring accumulated operation times of the optical shutter and the light source, and the control variables may change in correspondence to the accumulated operation times.

The emitting of the light towards the object may include sequentially emitting a plurality of light beams to the object at predetermined intervals, and the obtaining of the depth information may include measuring intensities of reflected light beams formed as the plurality of light beams are reflected by the object and modulated as the reflected light beams pass through a light modulator and extracting a difference between phases of the light emitted by the light source and the reflected light based on the measured intensities.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
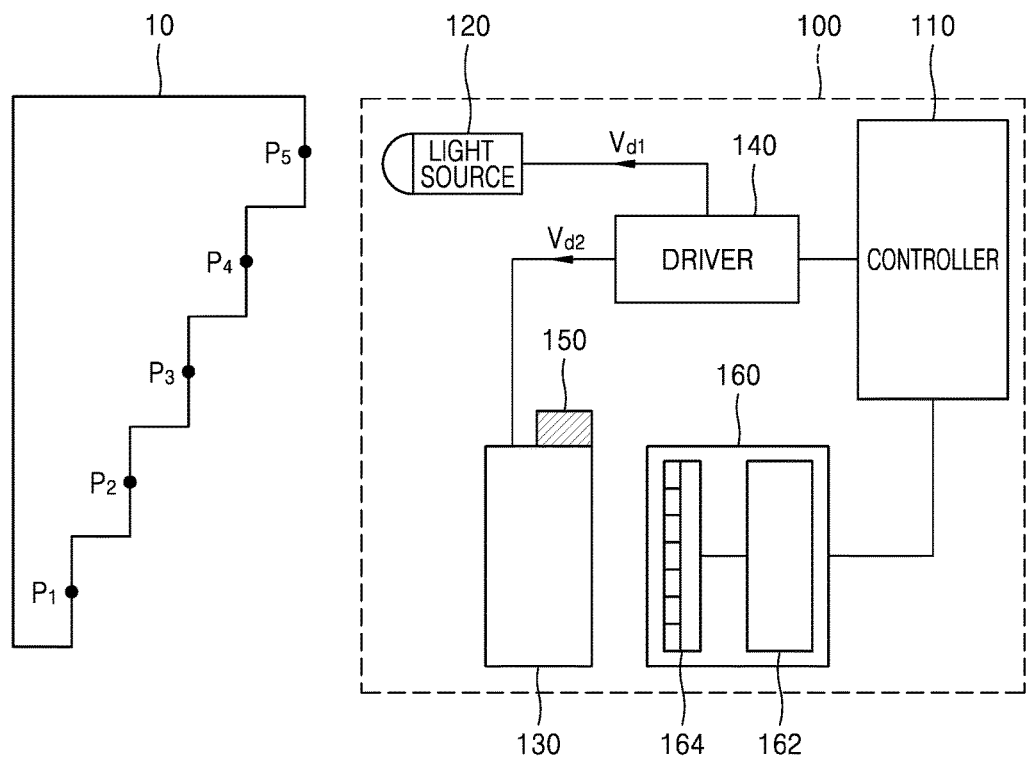
FIG. 1 is a diagram schematically showing a depth image generating apparatus according to an exemplary embodiment.

Hereinafter, exemplary embodiments of the present disclosure will be described in detail with reference to the accompanying drawings.

In addition, although the terms used in describing the exemplary embodiments may be selected from generally known and used terms, some of the terms mentioned in the description of the exemplary embodiments may have been selected by the Applicant at its discretion, the detailed meanings of which may be described in relevant parts of the description herein. Furthermore, the exemplary embodiments should be understood not simply by the actual terms used therein, but also by the meaning and context of each term.

Throughout the specification, it will be understood that when a portion is referred to as being "connected to" another portion, the portion can be "directly connected to" the other portion or "electrically connected to" the other portion via another element. Furthermore, it will be further understood that the terms "includes", "including", "comprises" and/or "comprising" used herein specify the presence of stated features or components, but do not preclude the presence or addition of one or more other features or components. In addition, the terms "-er", "-or", "-unit", and "module" described in the specification may refer to units for processing at least one function and operation and can be implemented by hardware components, software components, and combinations thereof.

In the description of the exemplary embodiments, the terms "comprising" and "including" should not be construed to necessarily include all of the elements or steps disclosed herein, and may be construed to further include additional elements or steps.

The terms used herein including an ordinal number such as first, second, etc., can be used to describe various elements, but the elements should not be limited by those terms. The terms are used merely to distinguish an element from the other element.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram schematically showing a depth image generating apparatus 100 according to an exemplary embodiment.

Referring to FIG. 1, the depth image generating apparatus 100 according to an exemplary embodiment may include a light source 120 that emits light to an object 10, an optical shutter 130 that is arranged on a traveling path of reflected light reflected by the object 10 and modulates the waveform of the reflected light by changing the transmissivity of the reflected light, and a driving unit 140 (e.g., driver) that applies driving voltages to the light source 120 and the optical shutter 130. Furthermore, the depth image generating apparatus 100 may also include a depth information obtaining unit 160 (e.g., depth information obtainer), which generates images of reflected light transmitted through the optical shutter 130, extracts a difference between phases of the light emitted to the object 10 and phases of the reflected light, and obtains depth information regarding the object 10 based on the difference of phases.

The light source 120 may emit light toward the object 10. The light source 120 may emit light having a wavelength in a near infrared ray (NIR) domain from 800 nm to 1000 nm. By emitting light of such a wavelength, light emitted by the light source 120 may not be visible to human eyes. The light source 120 may include a light-emitting diode (LED) or a laser diode (LD). The light source 120 may be connected to the driving unit 140. The driving unit 140 may operate the light source 120 by applying a driving voltage $V_{d1}$ to the light source 120. Intensity and wavelength of light emitted by the light source 120 may vary according to the size of the driving voltage $V_{d1}$ applied by the driving unit 140. For example, if the size of the driving voltage $V_{d1}$ applied to the light source 120 increases, intensity and wavelength of light emitted by the light source 120 may increase.

Furthermore, light emitted (radiated) by the light source 120 may be formed as pulse waves having a certain waveform. For example, light emitted by the light source 120 may have a waveform such as sine waves, RAMP waves, square waves, etc. Light emitted by the light source 120 may be reflected by the object 10. According to a distance between the object 10 and the light source 120, a difference between the phase of light emitted by the light source 120 and the phase of light reflected by the object 10 and incident to the optical shutter 130 may vary.

The optical shutter 130 may change the transmissivity of reflected light reflected by the object 10, thereby modulating the waveform of the reflected light. The shape of the reflected light modulated by the optical shutter 130 may vary according to the phase of the reflected light incident to the optical shutter 130. In other words, the phase of reflected light incident to the optical shutter 130 varies according to a distance between the object 10 and the light source 120, and thus the waveform of the reflected light modulated by the optical shutter 130 may vary. The transmissivity of the optical shutter 130 may vary according to a driving voltage $V_{d2}$ applied to the optical shutter 130 by the driving unit 140.

The depth information obtaining unit 160 may generate images of reflected light transmitted through the optical shutter 130 and obtain depth information regarding the object 10. The depth information obtaining unit 160 may include an imaging device 162 and a calculation module 164 (e.g., calculator) for calculating depth information. The imaging device 162 may detect reflected light modulated by the optical shutter 130. In case of measuring a distance to only one point on the object 10, the imaging device 162 may be configured as a single optical sensor, e.g., a photodiode or an integrator. However, in case of simultaneously measuring respective distances to a plurality of points P1, P2, P3, P4, and P5 on the object 10, the imaging device 162 may include a 2-dimensional (2D) or a 1-dimensional (1D) array of a plurality of photodiodes or other optical detectors. For example, the imaging device 162 may be a charge-coupled device (CCD) image sensor or a contact image sensor (CIS) having a 2D array. The imaging device 162 may measure an intensity of reflected light transmitted through the optical shutter 130. The intensity of light measured by the imaging device 162 may depend on a modulated waveform of the reflected light.

The calculation module 164 may calculate depth information regarding the object 10 based on image information detected by the imaging device 162. The calculation module 164 may calculate a difference between phases of reflected light and light emitted by the light source 120 by using intensity of the reflected light measured by the imaging device 162. Furthermore, the calculation module 164 may obtain depth information regarding the object 10 by calculating a distance between the light source 120 and the object 10 by using the difference between the phases.

Figure 2:
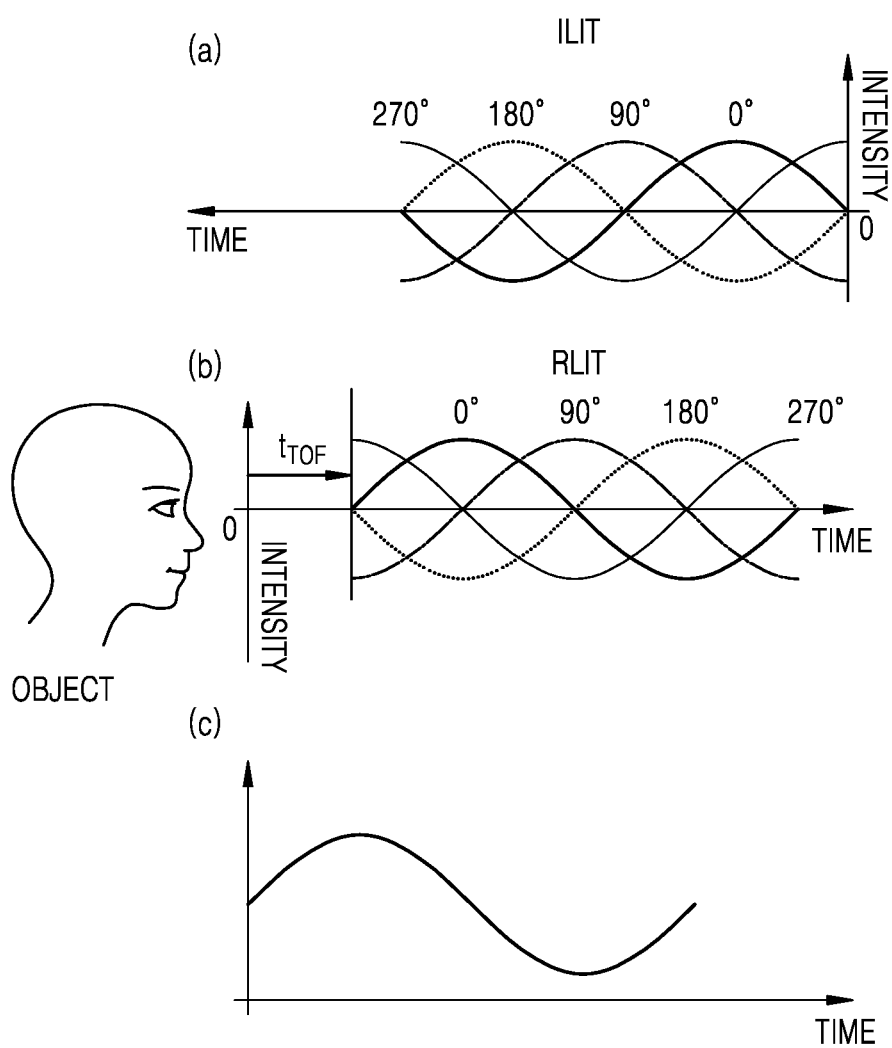
FIG. 2 is a diagram for describing the operation mechanism of a depth image generating apparatus according to an exemplary embodiment.

FIG. 2 is a diagram for describing the operation mechanism of a depth image generating apparatus according to an exemplary embodiment.

In FIG. 2, the graph (a) is a graph indicating a change of intensity of light emitted by the light source 120 according to the lapse of time. Furthermore, in FIG. 2, the graph (b) is a graph indicating a change of intensity of reflected light incident to the optical shutter 130 according to the lapse of time. Furthermore, in FIG. 2, the graph (c) is a graph indicating change of the transmissivity of the optical shutter 130 according to the lapse of time.

Referring to FIG. 2, the light source 120 may sequentially emit a plurality of light beams ILIT to the object 10. The plurality of emitted light beams ILIT may be emitted onto the object 10 at an interval of a certain idle time. Furthermore, the plurality of emitted light beams ILIT having phases different from one another may be emitted by the light source 120. For example, if the light source 120 emits N light beams onto the object 10, a difference between phases of light beams emitted at adjacent time slots, from among the light beams ILIT, may be identical to a value obtained by dividing 360 degrees by N. For example, if N is 4, phases of the emitted light beams ILIT may be 0 degree, 90 degrees, 180 degrees, and 270 degrees.

When the light source 120 emits the plurality of light beams ILIT onto the object 10 at an interval of a certain idle time, each of the reflected light beams RLIT formed by reflection of the emitted light beams ILIT may independently pass through the optical shutter 130 and be incident to the depth information obtaining unit 160. The transmissivity of the optical shutter 130 may be changed as time elapses as shown in the graph (c) of FIG. 2. Therefore, when the reflected light beams RLIT are transmitted through the optical shutter 130, waveforms of the reflected light beams RLIT may be modulated. The waveforms of the modulated reflected light beams RLIT may depend on the phases of the reflected light beams RLIT and the change of the transmissivity of the optical shutter 130 according to the lapse of time. The depth information obtaining unit 160 may generate images of the reflected light beams RLIT modulated by the optical shutter 130 and extract differences between phases of the reflected light beams RLIT and the emitted light beams ILIT.

As described above, changes of the waveforms of the reflected light beams RLIT may depend on phases of the reflected light beams RLIT and a change of the transmissivity of the optical shutter 130 according to the lapse of time. Therefore, it may be necessary to accurately control the transmissivity of the optical shutter 130 and correct depth information regarding the object 10 obtained according to operation characteristics of the optical shutter 130 to obtain accurate depth information.

Figure 3:
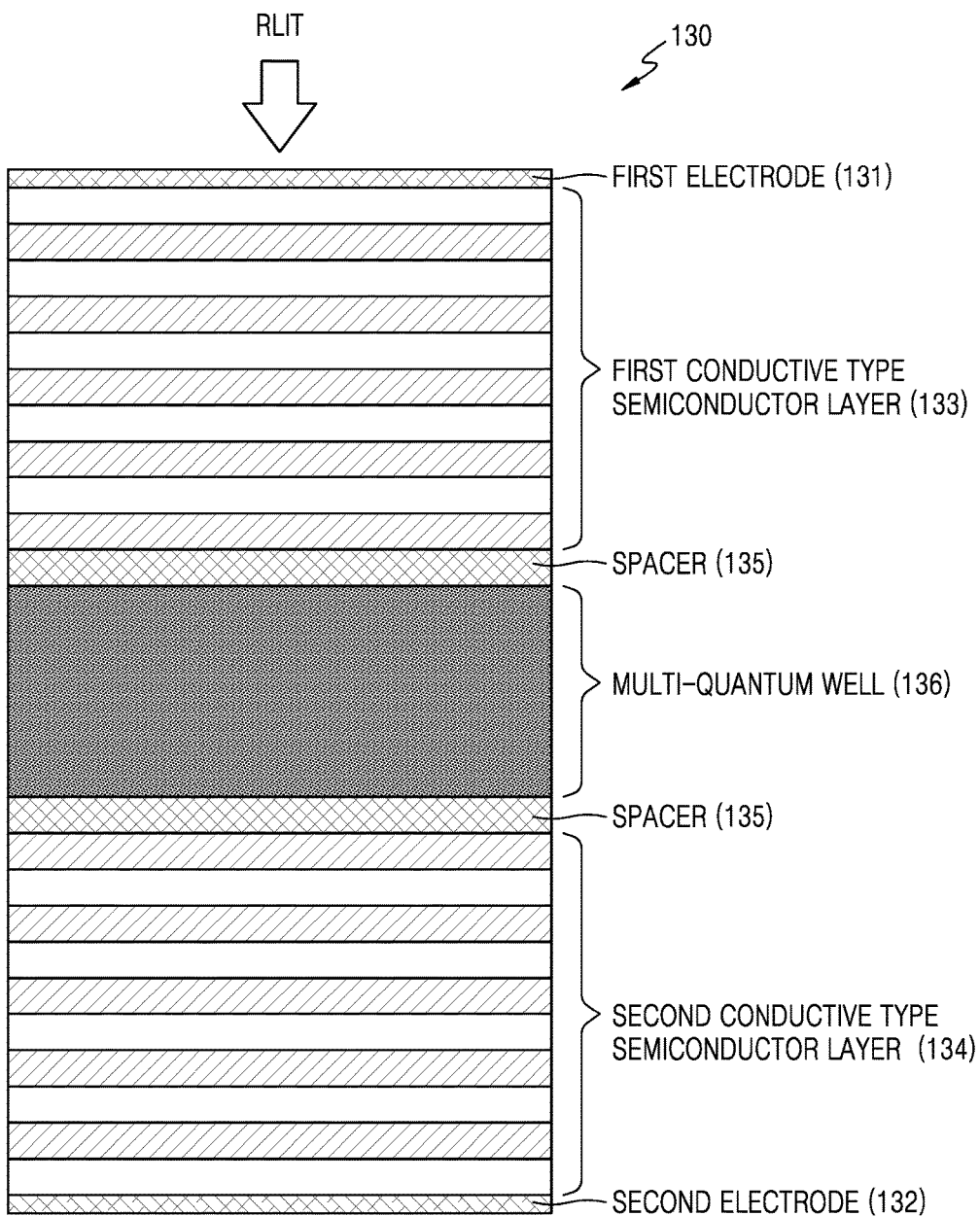
FIG. 3 is a diagram showing an example of an optical shutter shown in FIG. 1.

FIG. 3 is a diagram showing an example of the optical shutter 130 shown in FIG. 1.

Referring to FIG. 3, the optical shutter 130 may include a first electrode 131, a second electrode 132, a first conductive type semiconductor layer 133, a second conductive type semiconductor layer 134, at least one spacer 135, and a multi-quantum well 136. However, FIG. 3 merely shows an example of the optical shutter 130, and the depth image generating apparatus 100 may include optical shutters having a structure different from that of the optical shutter 130 shown in FIG. 3.

A driving voltage $V_{d2}$ may be applied between the first electrode 131 and the second electrode 132 by the driving unit 140. The first electrode 131 may be a p-type electrode, and the second electrode 132 may be an n-type electrode. In this case, the first conductive type semiconductor layer 133 may be a p-type distributed Bragg rectifier (DBR), and the second conductive type semiconductor layer 134 may be an n-type DBR. For example, each of the first conductive type semiconductor layer 133 and the second conductive type semiconductor layer 134 may be formed to have a structure in which $Al_{0.31}GaAs$ and $Al_{0.84}GaAs$ are alternately stacked. The spacers 135 are arranged between the first conductive type semiconductor layer 133, the second conductive type semiconductor layer 134, and the multi-quantum well 136. The spacers 135 may be formed of $Al_{0.31}GaAs$. The multi-quantum well 136 may be formed of GaAs and $Al_{0.31}GaAs$.

The first conductive type semiconductor layer 133 and the second conductive type semiconductor layer 134 function as a pair of resonating mirrors, and the multi-quantum well 136 absorbs an electric field and functions as a resonance cavity. A reverse bias voltage (the driving voltage $V_{d2}$) may be applied between the first electrode 131 and the second electrode 132. The transmissivity of the optical shutter 130 may vary according to the size of the reverse bias voltage.

Figure 4:
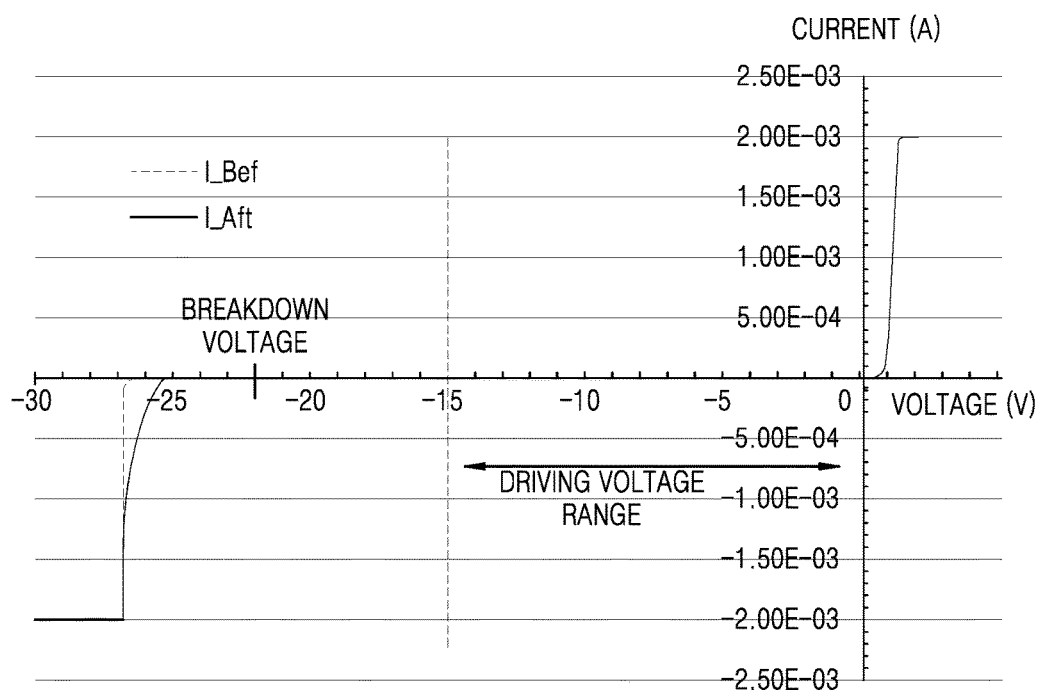
FIG. 4 is a graph showing electrical characteristics of an optical shutter shown in FIG. 3.

FIG. 4 is a graph showing electric characteristics of the optical shutter 130 shown in FIG. 2.

Referring to FIG. 4, the range of the driving voltage $V_{d2}$ applied to the optical shutter 130 may be included in the range of the reverse bias voltage. Furthermore, the driving voltage $V_{d2}$ may be higher than the breakdown voltage of the optical shutter 130. By applying the driving voltage $V_{d2}$ such that the driving voltage $V_{d2}$ is higher than the breakdown voltage, breakdown of the optical shutter 130 may be prevented. Furthermore, by setting the driving voltage $V_{d2}$ to be within the range of the reverse bias voltage, the optical shutter 130 may absorb light. The transmissivity of the optical shutter 130 may vary according to the wavelength of reflected light incident to the optical shutter 130 and the size of the driving voltage $V_{d2}$ applied to the optical shutter 130.

Figure 5:
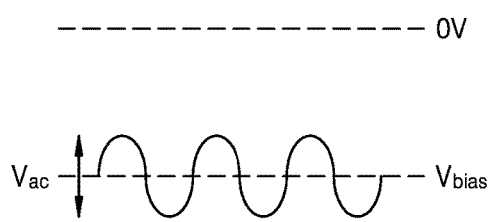
FIG. 5 is a diagram showing an example of a driving voltage applied by a driver to the optical shutter.

FIG. 5 is a diagram showing an example of the driving voltage $V_{d2}$ applied by the driving unit 140 to the optical shutter 130.

Referring to FIG. 5, the driving unit 140 may apply a negative voltage, that is, a reverse bias voltage to the optical shutter 130. The driving unit 140 may apply the driving voltage $V_{d2}$ to the optical shutter 130, such that the driving voltage $V_{d2}$ oscillates around a bias voltage $V_{bias}$ at a certain amplitude $V_{ac}$. As the driving unit 140 oscillates the driving voltage $V_{d2}$, the transmissivity of the optical shutter 130 may be periodically changed.

Figure 6:
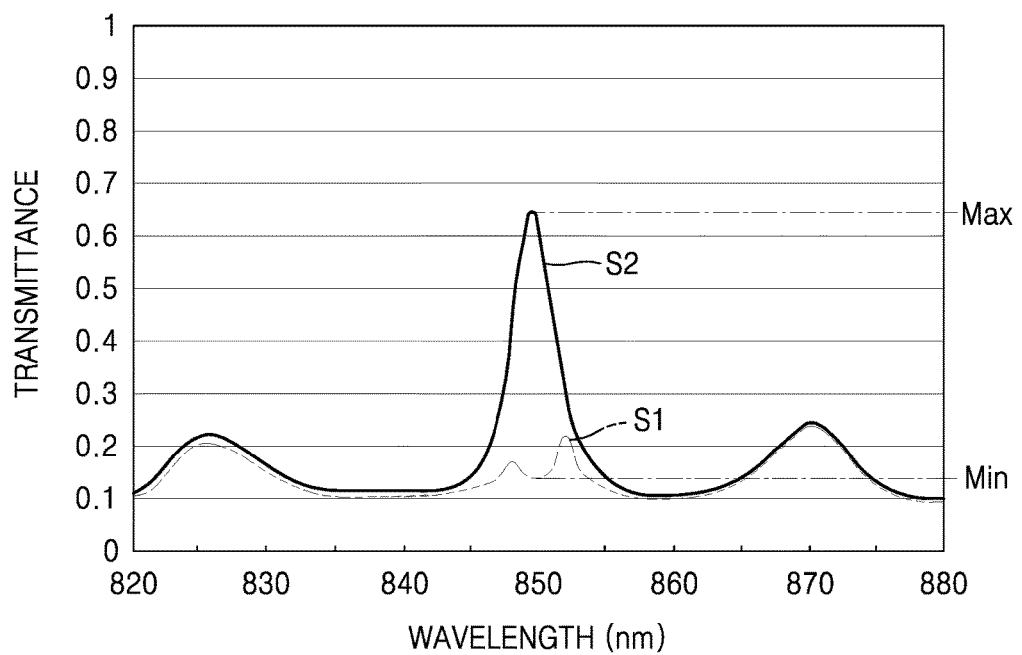
FIG. 6 is a graph showing a change of transmissivity of the optical shutter according to wavelengths of light incident thereon.

FIG. 6 is a graph showing a change of the transmissivity of the optical shutter 130 according to wavelengths of light incident to the optical shutter 130.

In FIG. 6, the graph S1 indicates the lowest transmissivity of the optical shutter 130 according to a change of the driving voltage $V_{d2}$ applied to the optical shutter 130. Furthermore, the graph S2 indicates the highest transmissivity of the optical shutter 130 according to a change of the driving voltage $V_{d2}$ applied to the optical shutter 130.

Referring to FIG. 6, a difference between the highest transmissivity and the lowest transmissivity of the optical shutter 130 may vary according to wavelengths of light incident to the optical shutter 130. For example, as shown in FIG. 6, the transmissivity of the optical shutter 130 regarding the reflected light beams RLIT may vary most significantly according to the level of the driving voltage $V_{d2}$ at a particular wavelength (about 850 nm). Therefore, for effective operation of the optical shutter 130, the light source 120 may emit light having a wavelength corresponding to the most significant change of the transmissivity of the optical shutter 130.

The graph of FIG. 6 is obtained under an assumption that the temperature of the optical shutter 130 is constant. However, if an operating time of a depth image generating apparatus increases, the temperature of the optical shutter 130 may be changed. In this case, operation characteristics of the optical shutter 130 may be changed, and thus, the transmissivity characteristics of the optical shutter 130 shown in FIG. 6 may be changed.

Figure 7:
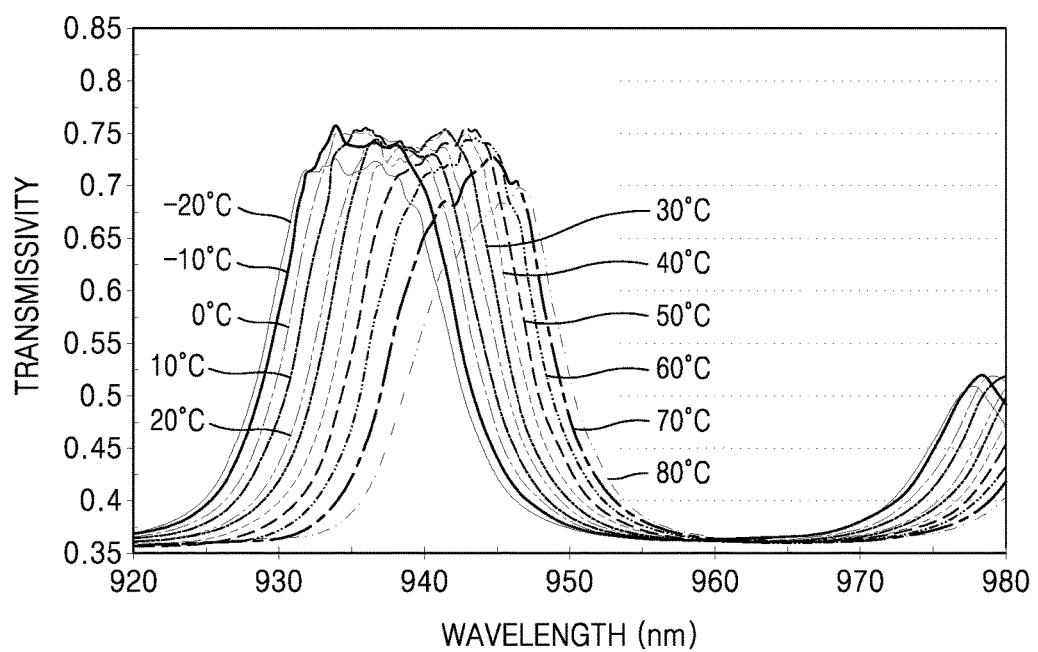
FIG. 7 is a diagram showing a change of highest transmissivity of the optical shutter according to wavelengths at different temperatures.

FIG. 7 is a diagram showing a change of the highest transmissivity of the optical shutter 130 according to wavelengths at different temperatures. For convenience of explanation, FIG. 7 shows only the highest transmissivity of the optical shutter 130 according to a change of the driving voltage $V_{d2}$.

Referring to FIG. 7, the highest transmissivity of the optical shutter 130 may vary according to wavelengths of light incident to the optical shutter 130. However, if the temperature of the optical shutter 130 is changed, a wavelength of light at which a peak of the graph regarding the highest transmissivity of the optical shutter 130 is formed is changed. For example, as shown in FIG. 7, as the temperature of the optical shutter 130 rises, a wavelength corresponding to the most significant change of the transmissivity of the optical shutter 130 may also increase. Therefore, it may be necessary for the light source 120 to emit light of different wavelengths according to the temperature of the optical shutter 130.

Figure 8:
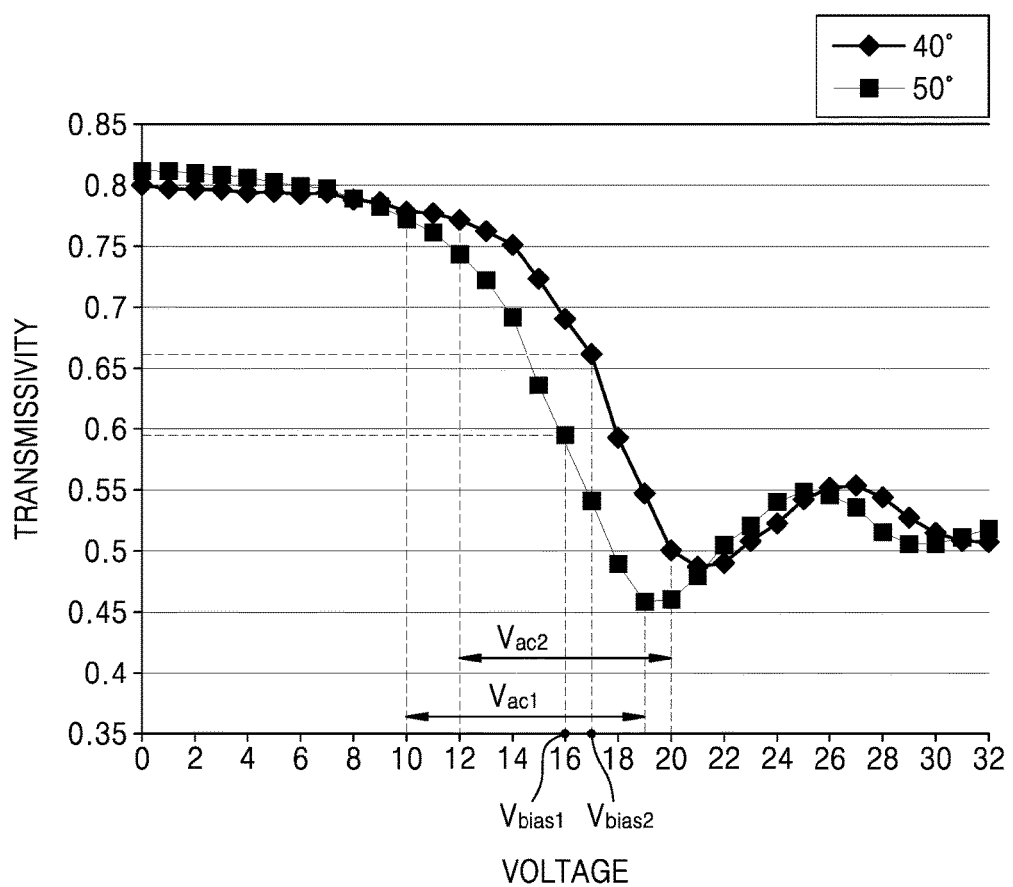
FIG. 8 is a graph showing a change of transmissivity of the optical shutter according to a change of a driving voltage applied thereto at different temperatures.

FIG. 8 is a graph showing a change of the transmissivity of the optical shutter 130 according to a change of the driving voltage $V_{d2}$ applied to the optical shutter 130 at different temperatures.

Referring to FIG. 8, a curve indicating a change of the transmissivity of the optical shutter 130 according to the driving voltage $V_{d2}$ may be changed according to the temperature of the optical shutter 130. For example, if the temperature of the optical shutter 130 is 50° C., a change of the transmissivity of the optical shutter 130 may be significant while the size of the driving voltage $V_{d2}$ is changed between 10V and 18V. Therefore, if the temperature of the optical shutter 130 is 50° C., the transmissivity of the optical shutter 130 may be effectively changed when the driving voltage $V_{d2}$ is changed by a first amplitude $V_{ac1}$ around a first bias voltage $V_{bias1}$. In contrast, if the temperature of the optical shutter 130 is 40° C., a change of the transmissivity of the optical shutter 130 may be significant while the size of the driving voltage $V_{d2}$ is changed between 12V and 20V. Therefore, if the temperature of the optical shutter 130 is 40° C., the transmissivity of the optical shutter 130 may be effectively changed when the driving voltage $V_{d2}$ is changed by a second amplitude $V_{ac2}$ around a second bias voltage $V_{bias2}$.

As described above, a wavelength of light for the most efficient operation of the optical shutter 130 and the driving voltage $V_{d2}$ applied to the optical shutter 130 may be changed according to a change of the temperature of the optical shutter 130.

Referring back to FIG. 1, the depth image generating apparatus according to an exemplary embodiment may include a temperature measuring unit 150 (e.g., temperature measurer) that measures the temperature of the optical shutter 130 and a control unit 110 that controls the driving voltages $V_{d1}$ and $V_{d2}$ of the driving unit 140 based on the temperature measured by the temperature measuring unit 150. The control unit 110 may control the driving unit 140 to achieve the most efficient change of the transmissivity of the optical shutter 130 in consideration of the changes of characteristics of the optical shutter 130 according to a change of temperatures as shown in FIGS. 7 and 8.

The temperature measuring unit 150 may measure the temperatures of the optical shutter 130. The temperature measuring unit 150 may or may not contact the optical shutter 130. The temperature measuring unit 150 may measure the temperature of the optical shutter 130 and transmit measurement results to the control unit 110 in real time or at a constant time interval.

The control unit 110 may control the driving voltage $V_{d1}$, which is applied by the driving unit 140 to the light source 120, according to the temperature of the optical shutter 130 measured by the temperature measuring unit 150. For example, as shown in FIG. 7, when the temperature of the optical shutter 130 is changed, a wavelength corresponding to the most significant change of the transmissivity of the optical shutter 130 may be changed. The control unit 110 may adjust the driving voltage $V_{d1}$ applied by the driving unit 140 to the light source 120 according to the temperature of the optical shutter 130, such that reflected light having the most efficient wavelength may be incident to the optical shutter 130.

Furthermore, the control unit 110 may control the driving voltage $V_{d2}$ applied by the driving unit 140 to the optical shutter 130 according to the temperature of the optical shutter 130 measured by the temperature measuring unit 150. For example, as shown in FIG. 8, if the temperature of the optical shutter 130 is changed, a range of the driving voltage $V_{d2}$ in which a change of the transmissivity of the optical shutter 130 may easily occur may be changed. Therefore, the control unit 110 may adjust the driving voltage $V_{d2}$ applied by the driving unit 140 to the optical shutter 130 according to the temperature of the optical shutter 130, such that a change of the transmissivity of the optical shutter 130 may easily occur.

The control unit 110 may control the bias voltage $V_{bias}$ as shown in FIG. 5 based on the temperature of the optical shutter 130 measured by the temperature measuring unit 150. Furthermore, the control unit 110 may adjust the amplitude $V_{ac}$, by which the driving voltage $V_{d2}$ changes as shown in FIG. 5, based on the temperature of the optical shutter 130 measured by the temperature measuring unit 150.

For example, referring to FIGS. 7 and 8, if the temperature of the optical shutter 130 is 50° C., the control unit 110 may control the driving voltage $V_{d2}$ applied by the driving unit 140 to be oscillated at the first amplitude $V_{ac1}$ around the first bias voltage $V_{bias1}$. Furthermore, if the temperature of the optical shutter 130 is 40° C., the control unit 110 may control the driving voltage $V_{d2}$ applied by the driving unit 140 to be oscillated at the second amplitude $V_{ac2}$ around the second bias voltage $V_{bias2}$. However, these values of temperature and voltage are merely examples, and exemplary embodiments of the present disclosure are not limited thereto. For example, the control unit 110 may adjust both end points of oscillation of the driving voltage $V_{d2}$. Furthermore, even at a same temperature, a range of change of the driving voltage $V_{d2}$ controlled by the control unit 110 may vary based on settings.

The control unit 110 may also adjust an output amount of light emitted by the light source 120 by controlling the driving voltage $V_{d1}$ applied to the light source 120. For example, when a distance between the light source 120 and the object 10 is sufficiently large, the light source 120 may emit light at a high output power. However, when the distance between the light source 120 and the object 10 is smaller than a particular distance, even if the light source 120 emits light at a low output power, the depth information obtaining unit 160 may obtain depth information regarding the object 10. Therefore, if the distance between the light source 120 and the object 10 is smaller than the particular distance, it may be efficient in terms of power consumption to reduce an output amount of light emitted by the light source 120. Furthermore, by controlling an output amount of light emitted by the light source 120, occurrence of saturation at the imaging device 162 of the depth information obtaining unit 160 may be prevented.

Figure 9:
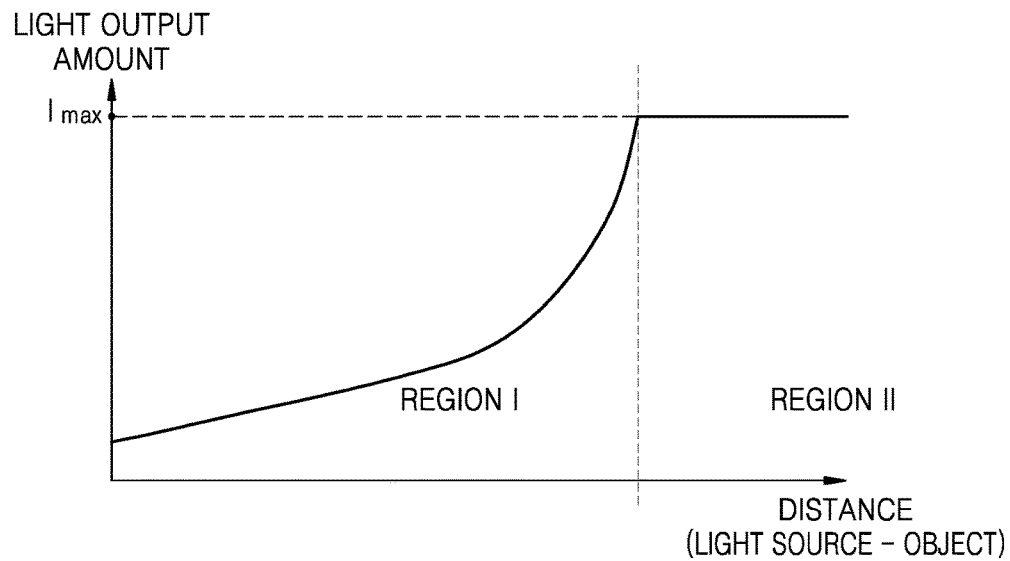
FIG. 9 is a graph showing a change of output amounts of light emitted by a light source according to distances between the light source and an object.

FIG. 9 is a graph showing a change of output amounts of light emitted by the light source 120 according to distances between the light source 120 and the object 10.

Referring to FIG. 9, in a region I in which a distance between the light source 120 and the object 10 is smaller than a particular distance, an output amount of light emitted by the light source 120 may be smaller than the largest light output amount $I_{max}$. In the region I, as the distance between the object 10 and the light source 120 increases, the output amount of light emitted by the light source 120 may also increase. As the output amount of light emitted by the light source 120 is appropriately changed, a sufficient light output amount for the depth information obtaining unit 160 to obtain depth information may be maintained. Furthermore, when the light source 120 is sufficiently close to the object 10, the output amount of light emitted by the light source 120 may be reduced, thereby reducing power consumption and preventing the imaging device 162 from being damaged. Furthermore, in a region II in which the distance between the light source 120 and the object 10 is greater than the particular distance, the output amount of light emitted by the light source 120 may be always maintained to be the largest light output amount $I_{max}$, thereby increasing an amount of light incident to the imaging device 162.

To adjust an output amount of light emitted by the light source 120 according to a distance between the light source 120 and the object 10, the control unit 110 may control the size of the driving voltage $V_{d1}$ applied by the driving unit 140 to the object 10. For example, the control unit 110 may receive depth information regarding the object 10 from the depth information obtaining unit 160. The control unit 110 may extract the distance between the object 10 and the light source 120 from the depth information regarding the object 10. Furthermore, the control unit 110 may control the size of the driving voltage $V_{d1}$ applied by the driving unit 140 to the light source 120 according to the distance between the object 10 and the light source 120. For example, if the control unit 110 determines that the distance between the object 10 and the light source 120 is within the region I of FIG. 9, the control unit 110 may control the driving unit 140 to change the driving voltage $V_{d1}$ according to a change of the distance between the object 10 and the light source 120. In contrast, if the control unit 110 determines that the distance between the object 10 and the light source 120 is within the region II of FIG. 9, the control unit 110 may control the driving voltage $V_{d1}$, such that the light source 120 always emits light at the highest output power $I_{max}$.

As described above, the control unit 110 may change the driving voltage Vd1 and Vd2 applied by the driver 140 according to the temperature of the optical shutter 130 and the depth information regarding the object 10 obtained by the depth information obtaining unit 160. The control unit 110 may include a lookup table therein for effectively controlling the driver 140.

For example, the control unit 110 may receive information regarding the temperature of the optical shutter 130 from the temperature measuring unit 150. Furthermore, the control unit 110 may receive the depth information regarding the object 10 from the depth information obtaining unit 160. Next, the control unit 110 may invoke control variables corresponding to the temperature of the optical shutter 130 and the depth information regarding the object 10 by using the lookup table. According to an exemplary embodiment, the control variables refer to variables that are changed according to controlled sizes of the driving voltage Vd1 and Vd2. The control unit 110 may invoke the control variables and transmit a control instruction determined based on the control variables to the driver 140.

Figure 10:
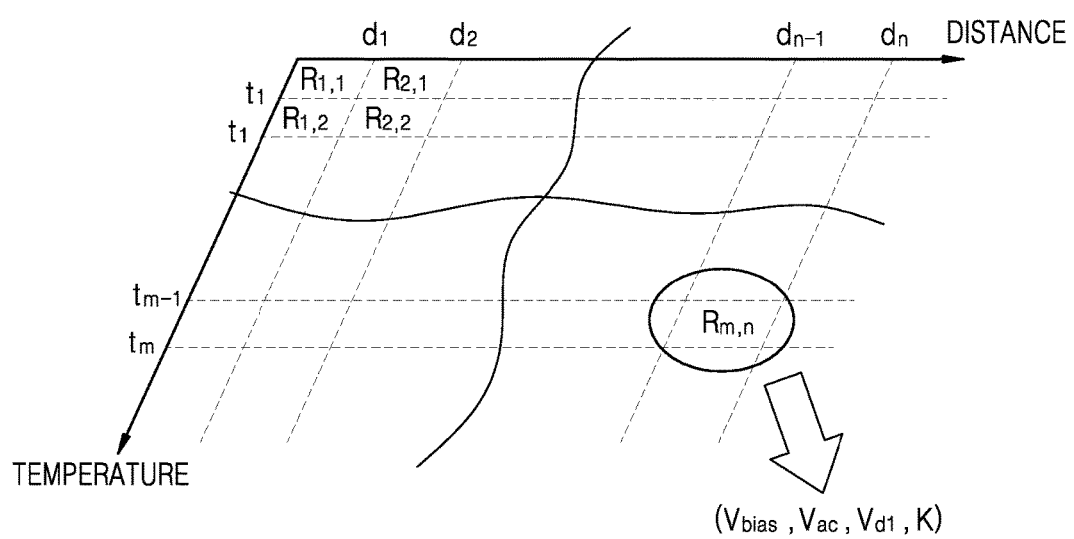
FIG. 10 is a diagram conceptually showing a lookup table in a controller.

FIG. 10 is a diagram conceptually showing a lookup table included in the control unit 110.

Referring to FIG. 10, the control variables, which are determined according to a plurality of sampling points based on the temperature of the optical shutter 130 and the distance between the object 10 and the light source 120, may be stored in the lookup table. The sampling points Rm,n may be points defined in a virtual 2D space indicated by the axis corresponding to the temperature of the optical shutter 130 and the axis corresponding to the distance between the object 10 and the light source 120. For example, an intersection point of an mth sampling temperature Tm and an nth distance dn may be a sampling point Rm,n determined based on the temperature tm and the distance dn.

Control variables respectively corresponding to a plurality of sampling points may be stored in the lookup table. The control variables may include variables for controlling the driving voltage Vd1 applied to the light source 120 and the driving voltage Vd2 applied to the optical shutter 130. For example, the control variables may include the bias voltage Vbias of the driving voltage Vd2 applied to the optical shutter 130. Furthermore, the control variables may include the amplitude Vac of the driving voltage Vd2 applied to the optical shutter 130. However, the bias voltage and amplitude are merely examples of control variables, and the control variables are not limited thereto according to other exemplary embodiments. For example, the control variables may include both end voltages of a range in which the driving voltage Vd2 changes. Furthermore, the control variables may include the driving voltage Vd1 applied to the light source 120.

When the control unit 110 receives information regarding the temperature of the optical shutter 130 and the depth information regarding the object 10 from the temperature measuring unit 150 and the depth information obtaining unit 160, respectively, the control unit 110 may determine a sampling point corresponding to the received information. If there is no exact sampling point corresponding to the received information, the control unit 110 may determine a most approximate sampling point. Next, the control unit 110 may invoke control variables corresponding to the determined sampling point from a lookup table. Next, the control unit 110 may control the driver 140 according to the control variables.

The control variables may include a correction value K for correcting the depth information regarding the object 10 obtained by the depth information obtaining unit 160. The correction value K may be set in consideration of operation characteristics of the optical shutter 130. Although the graph (c) of FIG. 2 shows an example in which the transmissivity of the optical shutter 130 is changed in a sine wave-like shape, such an example represents an ideal case. In reality, it may be difficult for the transmissivity of the optical shutter 130 to be changed in a perfect sine wave-like shape and the transmissivity of the optical shutter 130 may be changed irregularly.

Figure 11:
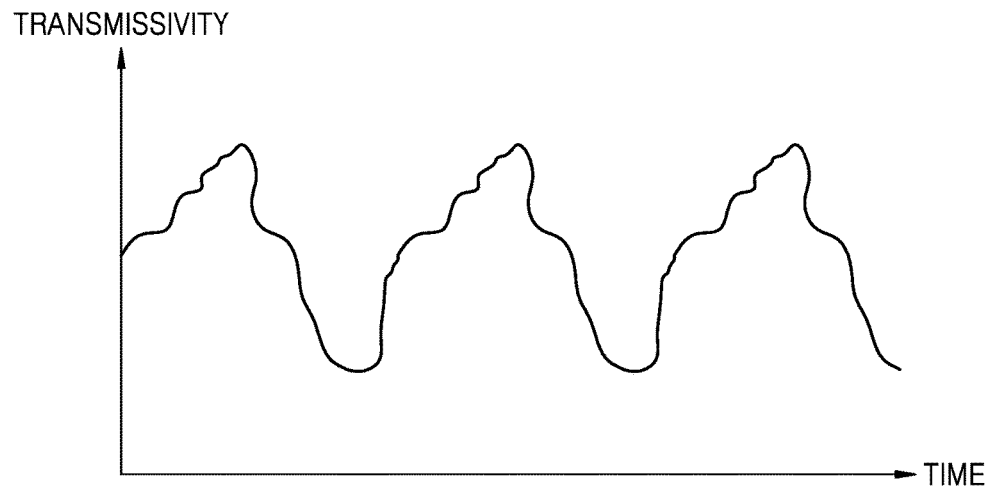
FIG. 11 is a diagram showing an actual change of transmissivity of the optical shutter.

FIG. 11 is a diagram showing an actual change of the transmissivity of the optical shutter 130.

Referring to FIG. 11, even if the driving voltage $V_{d2}$ applied to the optical shutter 130 has a sine wave-like waveform, a change of the transmissivity of the optical shutter 130 according to the lapse of time may not have a sine wave-like shape. The reason for the irregular change of the transmissivity of the optical shutter 130 is that, as shown in FIG. 8, the transmissivity of the optical shutter 130 is non-linearly changed with respect to a change of the driving voltage $V_{d2}$. To control the transmissivity of the optical shutter 130 to be changed in a perfect sine wave-like shape, it therefore may be necessary to correct the depth information regarding the object 10 obtained by the depth information obtaining unit 160. The control unit 110 may transmit the correction value K related to the depth information regarding the object 10 to the depth information obtaining unit 160. The depth information obtaining unit 160 may correct the depth information regarding the object 10 by using the correction value K, thereby correcting effects based on operation characteristics of the optical shutter 130. According to an exemplary embodiment, the operation characteristics of the optical shutter 130 may include the change of the transmissivity of the optical shutter 130 as shown in FIG. 11.

However, referring to FIG. 8, a relationship between the driving voltage $V_{d2}$ and the transmissivity of the optical shutter 130 may be changed according to the temperature of the optical shutter 130. Therefore, operation characteristics of the optical shutter 130 may also be changed according to the temperature of the optical shutter 130. Therefore, it may be necessary to change the correction value K for correcting operation characteristics of the optical shutter 130 according to the temperature of the optical shutter 130. The lookup table may store the correction values K corresponding to temperatures of the optical shutter 130 respectively indicated by sampling points, in correspondence to the respective sampling points. The control unit 110 may determine a sampling point corresponding to the temperature of the optical shutter 130 received from the temperature measuring unit 150. Next, the control unit 110 may invoke the correction value K stored in correspondence to the determined sampling point from the lookup table and transmit the correction value K to the depth information obtaining unit 160. Next, the depth information obtaining unit 160 may correct the depth information regarding the object 10 by using an appropriate correction constant K according to the temperature of the optical shutter 130. Accordingly, reliability of the depth information regarding the object 10 obtained by the depth information obtaining unit 160 may be improved.

As the accumulated operation time of the depth image generating apparatus 100 according to an exemplary embodiment increases, components of the depth image generating apparatus 100 may be degraded. In other words, as the accumulated operation times of the optical shutter 130 and the light source 120 included in the depth image generating apparatus 100 increase, performances of the optical shutter 130 and the light source 120 may be degraded. If performance of the optical shutter 130 is degraded, the graph indicating a change of the transmissivity of the optical shutter 130 may be changed. Therefore, if the accumulated operation time of the optical shutter 130 increases, a range of the driving voltage $V_{d2}$ for the most efficient operation of the optical shutter 130 may be changed even at a same temperature of the optical shutter 130. Furthermore, if performance of the light source 120 is degraded, the driving voltage $V_{d1}$ that is used for the light source 120 to emit light having a certain wavelength at a certain output power may be changed.

Figure 12:
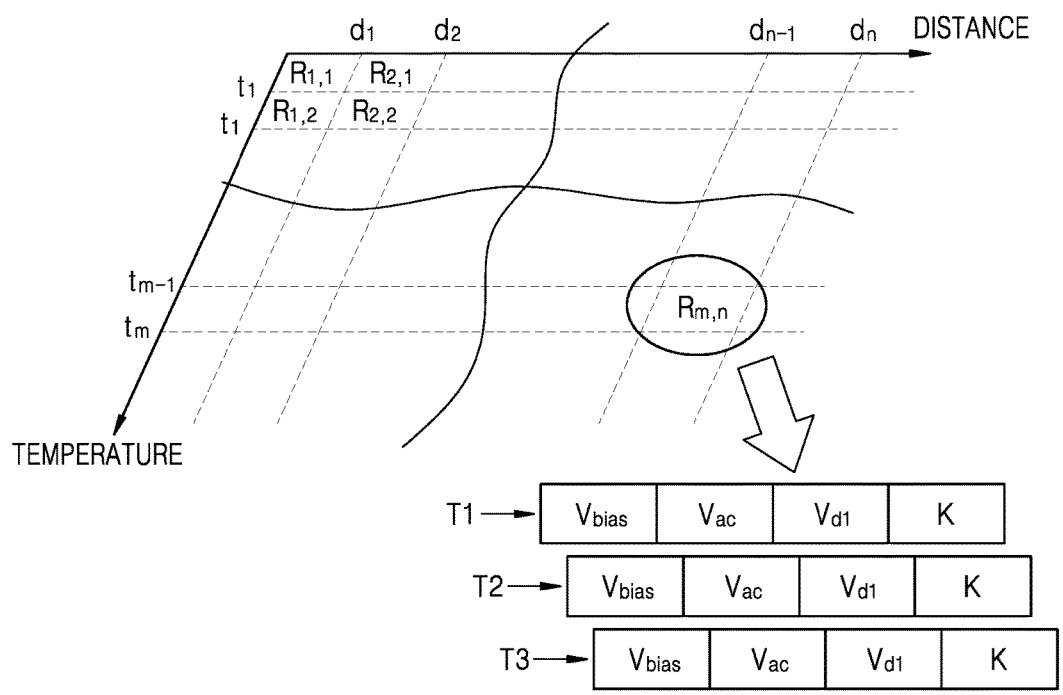
FIG. 12 is a diagram conceptually showing another example of the lookup table shown in FIG. 10.

FIG. 12 is a diagram conceptually showing another example of the lookup table shown in FIG. 10.

Referring to FIG. 12, control variables stored in the lookup table may be set to be changed in correspondence to the accumulated operation times. In other words, different control variables corresponding to the accumulated operation times of the optical shutter 130 and the light source 120 may be stored at respective sampling points of the lookup table. The control unit 110 may invoke corresponding control variables according to the accumulated operation times of the light source 120 and the optical shutter 130 and control the driving unit 140. Therefore, changes of performance due to accumulation of operation times of the light source 120 and the optical shutter 130 may be compensated.

Figure 13:
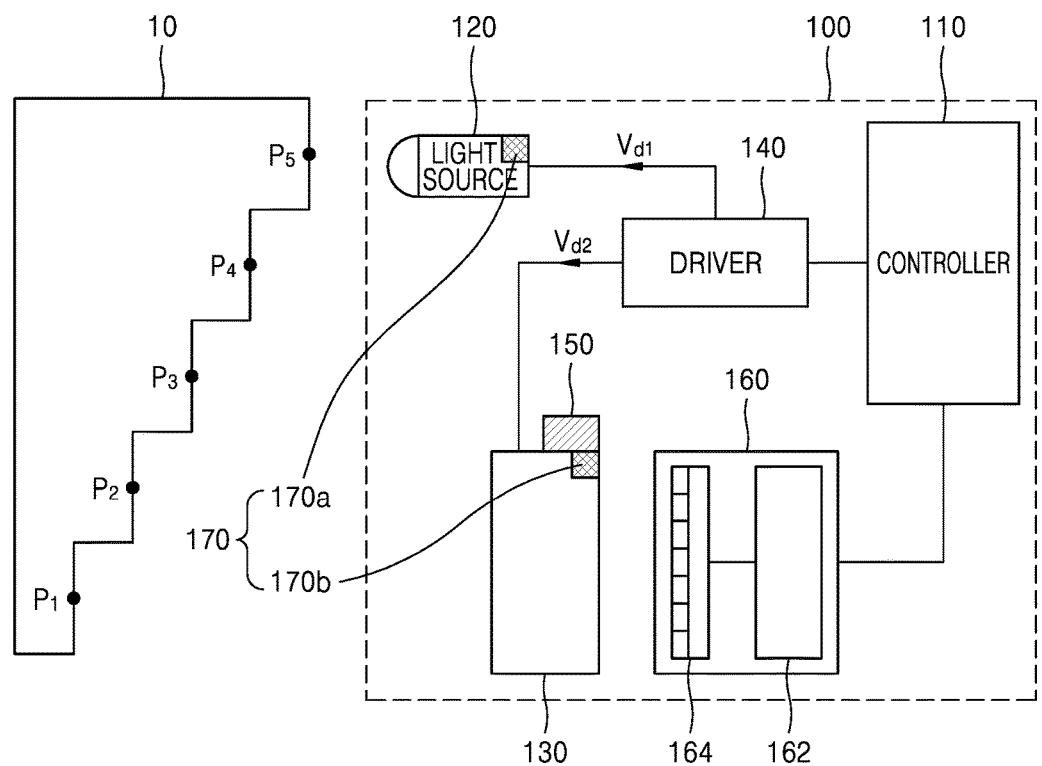
FIG. 13 is a diagram showing a depth image generating apparatus according to another exemplary embodiment.

FIG. 13 is a diagram showing a depth image generating apparatus according to an exemplary embodiment.

Referring to FIG. 13, the depth image generating apparatus according to another exemplary embodiment may further include an operation time measuring unit 170 (e.g., operation time measurer) for measuring the accumulated operation times of the optical shutter 130 and the light source 120. For example, the operation time measuring unit 170 may include a first operation time measuring unit 170a for measuring the accumulated operation time of the light source 120 and a second operation time measuring unit 170b for measuring the accumulated operation time of the optical shutter 130. However, since the light source 120 and the optical shutter 130 operate together in most cases (and thus, will have the same operating time), the operation time measuring unit 170 may include or use only one of the first and second operation time measuring units 170a and 170b in such a situation.

The operation time measuring unit 170 may measure the accumulated operation times of the light source 120 and the optical shutter 130 and transmit a result of the measurement to the control unit 110. The control unit 110 may invoke control variables corresponding to the accumulated operation times of the light source 120 and the optical shutter 130 from the lookup table.

Figure 14:
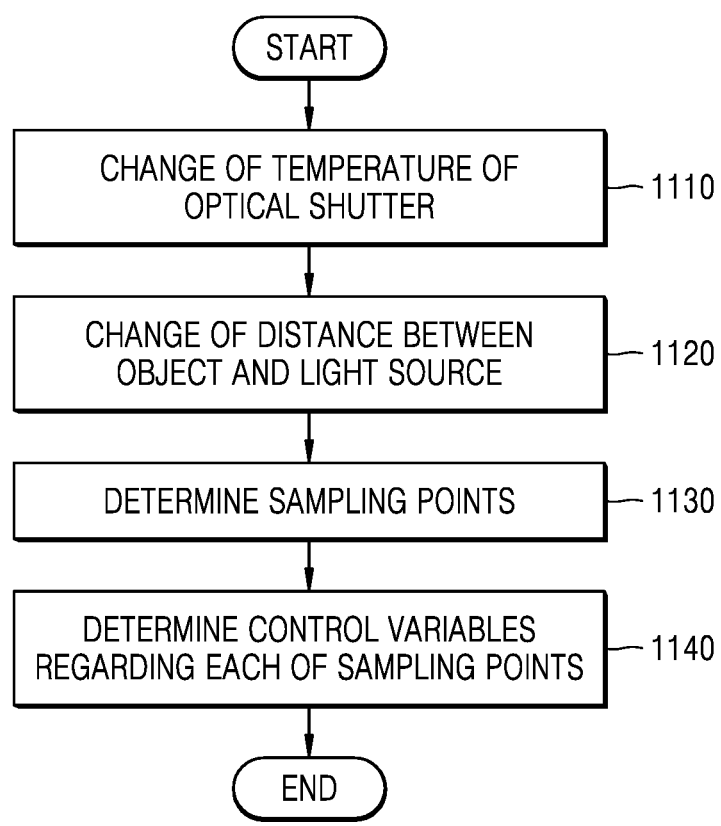
FIG. 14 is a flowchart of a process of generating the lookup table shown in FIG. 10.

FIG. 14 is a flowchart showing a process of generating the lookup table shown in FIG. 10.

Referring to FIG. 14, a method of generating a lookup table for the depth image generating apparatus 100 according to an exemplary embodiment includes an operation 1110 of changing the temperature of the optical shutter 130, an operation 1120 of changing a distance between the light source 120 and the object 10, an operation 1130 of determining a plurality of sampling points in correspondence to the temperature of the optical shutter 130 and the distance between the light source 120 and the object 10, and an operation 1140 of determining control variables for the most efficient operation of the depth image generating apparatus 100 by repeatedly detecting depth information regarding each of the sampling points.

In operation 1110, the temperature of the optical shutter 130 may be changed to a temperature corresponding to any one of the sampling points of the lookup table shown in FIGS. 10 and 12. Furthermore, in operation 1120, the distance between the light source 120 and the object 10 may be changed to a distance corresponding to any one of the sampling points of the lookup table shown in FIGS. 10 and 12.

In operation 1130, the sampling points may be determined in correspondence to the temperature of the optical shutter 130 and the distance between the light source 120 and the object 10 that are respectively changed in the operations 1110 and 1120. A plurality of sampling points corresponding to different temperatures and distances may be determined by changing the temperature and the distance in the operations 1110 and 1120.

In operation 1140, depth information regarding the object 10 may be repeatedly measured with respect to each of the sampling points by using the depth image generating apparatus 100. In other words, by measuring depth information regarding the object 10 at each of the sampling points by changing control variables, control variables for the most efficient operation of the depth image generating apparatus 100 at each of the sampling points may be determined.

As described above, the control variables may include a bias voltage $V_{bias}$ regarding the driving voltage $V_{d2}$ applied to the optical shutter 130 and the amplitude of the driving voltage $V_{d2}$. Furthermore, the control variables may include the driving voltage $V_{d1}$ applied to the light source 120 and a correction value K for correcting the depth information regarding the object 10 obtained by the depth information obtaining unit 160.

The control variables for the most efficient operation of the depth image generating apparatus 100 at each of the sampling points may be determined in various ways. For example, the control variables may be determined by analyzing the graph indicating changes of the transmissivity of the optical shutter 130 as shown in FIGS. 6 to 8 for each of the sampling points. In another example, the depth information regarding the object 10 may be repeatedly measured at each of the sampling points by changing the control variables and the control variables corresponding to the smallest deviation of the measured depth information may be determined as the control variables for the most efficient operation of the depth image generating apparatus 100. According to an exemplary embodiment, the deviation of the depth information refers to a range of variation of the depth information in case of measuring the depth information under the same conditions. For example, even if depth information is repeatedly measured with respect to a same sampling point by operating the driving unit 140 with the same control variables, a measured depth information may not be consistent. A deviation may be determined based on differences between depth information measured under the same conditions. Furthermore, control variables corresponding to the smallest deviation may be determined as the control variables corresponding to the sampling point.

Figure 15:
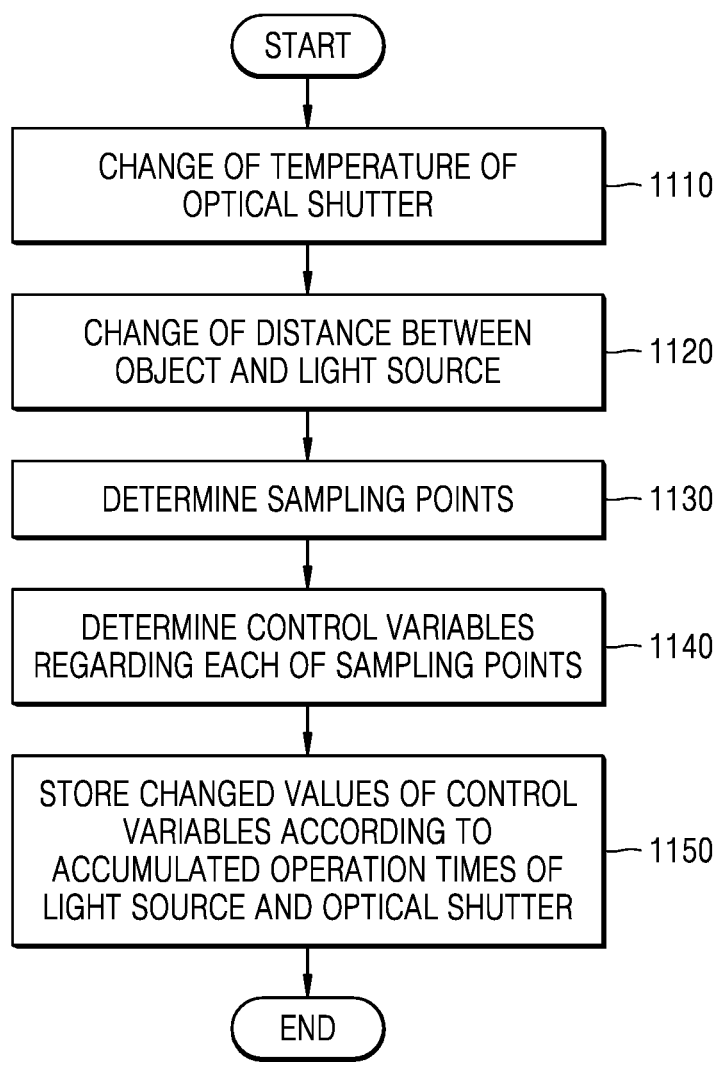
FIG. 15 is a flowchart of a process for generating the lookup table shown in FIG. 12.

FIG. 15 is a flowchart showing a process for generating the lookup table shown in FIG. 12.

Referring to FIG. 15, a method of generating a lookup table for a depth image generating apparatus 100 may further include an operation 1150 for storing changed values of the control variables corresponding to respective sampling points according to the accumulated operation times of the optical shutter 130 and the light source 120.

In operation 1150, the operations 1110 to 1140 may be repeatedly performed by changing the accumulated operation times of the optical shutter 130 and the light source 120 and control variables corresponding to the accumulated operation times may be further stored in the lookup table. Therefore, as shown in FIG. 12, control variables may be changed at the respective sampling points according to the accumulated operation times.

The method of generating a lookup table for the depth image generating apparatus 100 has been described above with reference to FIGS. 14 and 15. However, in case of mass-producing the depth image generating apparatuses 100 under the same process conditions, it may be inefficient in terms of cost and time for repeating the operations shown in FIG. 14 or FIG. 15 with respect to all products. Therefore, in case of the plurality of depth image generating apparatuses 100 being manufactured under the same process conditions, a lookup table may be generated with respect to one product by performing the operations shown in FIG. 14 or 15, and the lookup table generated with respect to the one product may be referred to for the remaining products. As a result, a process for generating lookup tables may be simplified.

Figure 16:
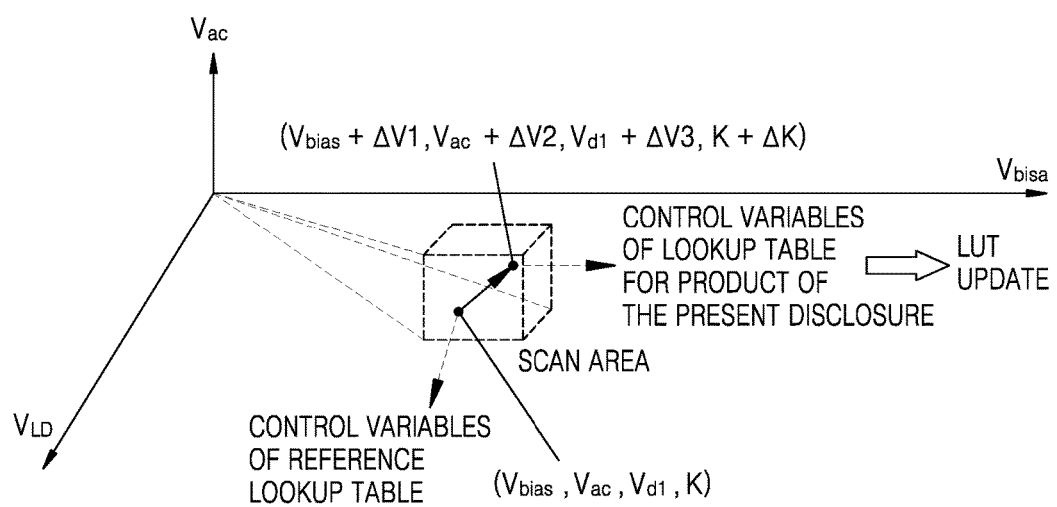
FIG. 16 is a schematic diagram showing the above-stated process for generating lookup tables.

FIG. 16 is a schematic diagram showing the above-described process for generating lookup tables.

Referring to FIG. 16, a lookup table generated with respect to one product may be utilized as a reference lookup table for generating lookup tables for other products. For example, a lookup table generated with respect to a first product may be utilized as a reference lookup table. Next, control variables may be determined with respect to a first sampling point only for a second product. Here, it may be assumed that control variables of the second product may not be significantly different from the control variables of the reference lookup table. Therefore, control variables for the most efficient operation of the second product may be determined by scanning control variables of the second products in the vicinity of the control variables of the lookup table.

Differences $\Delta V1$, $\Delta V2$, $\Delta V3$, and $\Delta K$ between the control variables of the second product determined at the first sampling point and the control variables of the reference lookup table corresponding to the first sampling point may be calculated. Next, control variables corresponding to each of the other sampling points of the lookup table of the second product may be determined by respectively shifting the control variables corresponding to each of the other sampling points of the reference lookup table by the differences $\Delta V1$, $\Delta V2$, $\Delta V3$, and $\Delta K$. Therefore, a process for generating a lookup table when the depth image generating apparatus 100 are mass-produced may be simplified.

Figure 17:
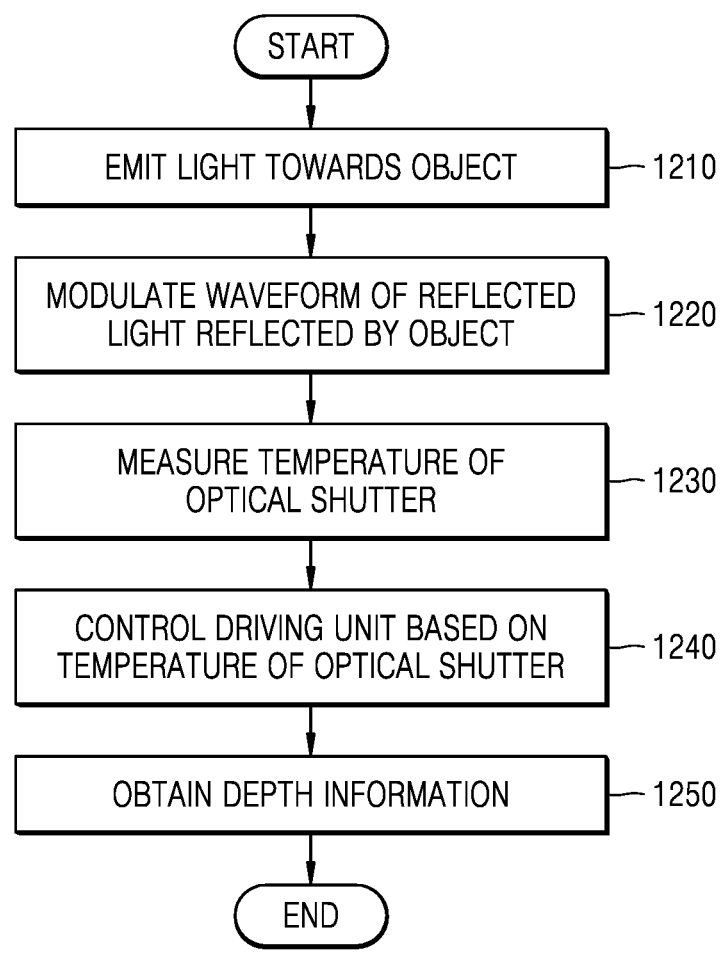
FIG. 17 is a flowchart of a method of generating a depth image of an object by using a depth image generating apparatus, according to an exemplary embodiment.

FIG. 17 is a flowchart showing a method of generating a depth image of the object 10 by using the depth image generating apparatus 100, according to an exemplary embodiment.

Referring to FIG. 17, the method of generating a depth image according to an exemplary embodiment may include an operation 1210 of emitting light onto the object 10 by using the light source 120, an operation 1220 of modulating the waveform of reflected light reflected by the object 10 by changing the transmissivity of the reflected light, an operation 1230 of measuring the temperature of the optical shutter 130, an operation 1240 of controlling the driving unit 140 that applies the driving voltages $V_{d1}$ and $V_{d2}$ applied to the optical shutter 130 and the light source 120 based on the measured temperature of the optical shutter 130, and an operation 1250 of extracting a difference between phases of the light emitted by the light source 120 to the object 10 and the reflected light and obtaining the depth information regarding the object 10 based on the phase difference.

In operation 1210, the light source 120 may emit light toward the object 10. The light emitted by the light source 120 may have a wavelength in a near infrared ray (NIR) domain from 800 nm to 1000 nm. The light emitted by the light source 120 may be a pulse wave having a certain waveform. For example, the light emitted by the light source 120 may have a sine waveform, a RAMP waveform, a square waveform, etc.

In operation 1220, the optical shutter 130 may modulate the waveform of the reflected light by changing the transmissivity of the reflected light. The waveform of the modulated reflected light may depend on the phase of the reflected light and the change of the transmissivity of the optical shutter 130. The change of the transmissivity of the optical shutter 130 may be induced by a change of the driving voltage $V_{d2}$ applied to the optical shutter 130. The driving unit 140 may apply the driving voltage $V_{d2}$ applied to the optical shutter 130 to oscillate around the bias voltage $V_{bias}$.

In operation 1230, the temperature measuring unit 150 may measure the temperature of the optical shutter 130. The temperature measuring unit 150 may transmit a result of the measurement to the control unit 110.

In operation 1240, the control unit 110 may control the operation of the driving unit 140 based on the temperature of the optical shutter 130. The control unit 110 may control the driving voltages $V_{d1}$ and $V_{d2}$ applied by the driving unit 140. In operation 1240, the control unit 110 may further consider depth information obtained by the depth information obtaining unit 160 and control the driving voltage $V_{d1}$ applied by the driving unit 140 to the light source 120.

Furthermore, in operation 1240, the control unit 110 may invoke control variables for controlling the driving unit 140 from a lookup table. The lookup table may be generated as shown in FIGS. 10 and 12.

In operation 1250, the depth information obtaining unit 160 may generate an image of reflected light that passed through the optical shutter 130 and extract a difference between phases of the reflected light and the light emitted by the light source 120. The depth information obtaining unit 160 may then obtain depth information regarding the object 10 from the phase difference.

A depth image generating apparatus, a method of generating a depth image, and a method of generating a lookup table for the depth image generating apparatus according to certain exemplary embodiments have been described above with reference to FIGS. 1 to 17. According to the above-described exemplary embodiments, reliability of an obtained depth image may be improved by effectively controlling the driving voltages $V_{d1}$ and $V_{d2}$ applied to the optical shutter 130 and the light source 120 in consideration of a change of the operation of the optical shutter 130 according to a change of the temperature of the optical shutter 130. Furthermore, a light output amount of the light source 120 may be effectively controlled according to a distance between the light source 120 and the object 10.

According to exemplary embodiments of the present disclosure, driving voltages applied to an optical shutter and a light source may be appropriately controlled for effective light modulation of the optical shutter.

Furthermore, by appropriately controlling the output power of a light source according to a distance between the light source and an object, power consumption may be reduced and damages to components may be prevented.

The devices and structural components described herein according to certain exemplary embodiments may include a processor, a memory for storing program data and executing the stored program data, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

The exemplary embodiments may be described in terms of functional block components and various processing operations. Such functional blocks may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the exemplary embodiments could employ any number of techniques appreciated by those skilled in the art for electronics configuration, signal processing and/or control processing, data processing and the like. The words "mechanism", "element", "means", and "configuration" are used broadly and are not limited to mechanical or physical exemplary embodiments, but can include software routines in conjunction with processors, etc.

The particular implementations shown and described herein are illustrative examples of the exemplary embodiments and are not intended to otherwise limit the scope of the exemplary embodiments in any way. For the sake of brevity, conventional electronics, control systems, software development and other functional aspects of the systems may not be described in detail. Furthermore, the connecting lines, or connectors, shown in the various figures presented are intended to represent exemplary functional relationships and/or physical or logical couplings between the various elements. It should be noted that many alternative or additional functional relationships, physical connections or logical connections may be present in a real-world device.

The use of the terms "a" and "an" and "the" and similar referents in the context of describing the exemplary embodiments (especially in the context of the following claims) are to be construed to cover both the singular and the plural.

Furthermore, recitation of ranges of values herein are merely intended to serve as a shorthand method of referring individually to each separate value falling within the range, unless otherwise indicated herein, and each separate value is incorporated into the specification as if it were individually recited herein. Also, the operations (steps) of all methods described herein can be performed in any suitable order unless otherwise indicated herein or otherwise clearly contradicted by context. The exemplary embodiments are not limited to the described order of the steps. The use of any and all examples, or exemplary language (e.g., "such as") provided herein, is intended merely to better illuminate the exemplary embodiments and does not pose a limitation on the scope of the exemplary embodiments unless otherwise claimed. Numerous modifications and adaptations will be readily apparent to one of ordinary skill in the art without departing from the spirit and scope of the exemplary embodiments.

What is claimed is:

1. A depth image generating apparatus comprising:
a light source configured to emit light towards an object so that the light is reflected by the object;
an optical shutter provided on a path of the light reflected by the object and configured to modulate a waveform of the reflected light by changing a transmissivity of the optical shutter with respect to the reflected light;
a driver configured to apply a driving voltage to the light source and a driving voltage to the optical shutter;
a temperature measurer configured to measure a temperature of the optical shutter;
a controller configured to control the driving voltage applied to the light source and the driving voltage applied to the optical shutter based on the temperature measured by the temperature measurer; and
a depth information obtainer configured to generate an image corresponding to the reflected light that passes through the optical shutter, extract a phase difference between a phase of the light emitted by the light source to the object and a phase of the reflected light, and obtain depth information regarding the object based on the phase difference.

2. The depth image generating apparatus of claim 1, wherein the driver is further configured to change the transmissivity of the optical shutter by changing the driving voltage applied by the driver to the optical shutter.

3. The depth image generating apparatus of claim 2, wherein the driver is further configured to oscillate the driving voltage applied to the optical shutter around a bias voltage.

4. The depth image generating apparatus of claim 3, wherein the controller is further configured to control the bias voltage based on the temperature measured by the temperature measurer.

5. The depth image generating apparatus of claim 4, wherein the controller is further configured to control an amplitude of the driving voltage applied to the optical shutter based on the temperature measured by the temperature measurer.

6. The depth image generating apparatus of claim 1, wherein the driver is further configured to change at least one of a wavelength and an intensity of the light emitted towards the object by changing the driving voltage applied to the light source.

7. The depth image generating apparatus of claim 6, wherein the controller is further configured to control the driver to change a size of the driving voltage applied to the light source according to the depth information regarding the object obtained by the depth information obtainer.

8. The depth image generating apparatus of claim 1, further comprising a lookup table comprising control variables for controlling the driver, the lookup table being embedded in the controller.

9. The depth image generating apparatus of claim 8, wherein the control variables are determined by a plurality of sampling points based on the temperature measured by the temperature measurer and the distance between the object and the light source.

10. The depth image generating apparatus of claim 9, wherein the control variables comprise a bias voltage regarding the driving voltage of the optical shutter.

11. The depth image generating apparatus of claim 10, wherein the driver is further configured to oscillate the driving voltage applied to the optical shutter around the bias voltage.

12. The depth image generating apparatus of claim 11, wherein the control variables comprise an amplitude of the driving voltage applied to the optical shutter.

13. The depth image generating apparatus of claim 9, wherein the control variables comprise a size of the driving voltage applied to the light source.

14. The depth image generating apparatus of claim 9, wherein the control variables comprise a correction value for correcting the depth information regarding the object obtained by the depth information obtainer, the correction value being determined based on operation characteristics of the optical shutter, and
the depth information obtainer is configured to correct the depth information regarding the object based on the correction value.

15. The depth image generating apparatus of claim 9, further comprising an operation time measurer configured to measure accumulated operation times of the optical shutter and the light source,
wherein the control variables change in correspondence to the accumulated operation times.

16. The depth image generating apparatus of claim 1, wherein the light source is further configured to sequentially emit a plurality of light beams towards the object at predetermined intervals, and
the depth information obtainer is further configured to measure intensities of reflected light beams formed as the plurality of light beams are reflected by the object and modulated as the reflected light beams pass through a light modulator, and to extract a difference between a phase of the light emitted by the light source and phases of the reflected light beams.

17. A method of generating a lookup table for controlling a depth image generating apparatus according to a temperature of an optical shutter of the depth image generating apparatus and a distance between a light source of the depth image generating apparatus and an object which reflects light emitted by the light source, the method comprising:
determining a plurality of sampling points in correspondence to the temperature of the optical shutter and the distance between the light source of the depth image generating apparatus and the object; and
determining control variables for a depth image determining operation to be performed by the depth image generating apparatus by repeatedly measuring depth information regarding the object with respect to each of the plurality of sampling points.

18. The method of claim 17, wherein the control variables comprise a bias voltage regarding a driving voltage of the optical shutter.

19. The method of claim 17, wherein the control variables comprise an amplitude of the driving voltage of the optical shutter, and wherein the driving voltage oscillates around the bias voltage.

20. The method of claim 17, wherein the control variables comprise a size of a driving voltage applied to the light source.

21. The method of claim 17, wherein the determining of the control variables comprises repeatedly measuring the depth information regarding the object at each of the sampling points by changing the control variables and determining the control variables corresponding to a smallest deviation of the measured depth information as the control variables for the depth image determining operation to be performed by the depth image generating apparatus.

22. The method of claim 17, further comprising storing changed values of the control variables corresponding to the respective sampling points according to accumulated operation times of the optical shutter and the light source.

23. A method of generating a depth image, the method comprising:
    emitting light toward an object by using a light source so that the light is reflected by the object;
    modulating a waveform of the light reflected by the object by changing a transmissivity of the reflected light by using an optical shutter;
    measuring a temperature of the optical shutter;
    controlling a driving voltage applied to the optical shutter and a driving voltage applied to the light source based on the temperature of the optical shutter;
    extracting a phase difference between a phase of the light emitted by the light source towards the object and a phase of the reflected light by measuring an intensity of the reflected light that passes through the optical shutter; and
    obtaining depth information regarding the object based on the phase difference.

24. The method of claim 23, further comprising oscillating, by a driver, the driving voltage applied to the optical shutter around a bias voltage.

25. The method of claim 24, wherein the controlling of the driving voltages comprises controlling the bias voltage and an amplitude of the driving voltage based on the temperature of the optical shutter measured by a temperature measurer.

26. The method of claim 23, wherein the controlling of the driving voltages comprises controlling a driver to change a size of the driving voltage applied to the light source according to the depth information.

27. The method of claim 23, wherein the controlling of the driving voltages comprises:
    invoking, from a lookup table, control variables for controlling the driving voltages; and
    controlling the driving voltages based on the control variables.

28. The method of claim 27, further comprising storing the control variables in the lookup table,
    wherein the control variables are determined by a plurality of sampling points based on the temperature of the optical shutter and the distance between the object and the light source.

29. The method of claim 27, further comprising measuring accumulated operation times of the optical shutter and the light source,
    wherein the control variables change in correspondence to the accumulated operation times.

30. The method of claim 25, wherein the emitting of the light towards the object comprises sequentially emitting a plurality of light beams to the object at predetermined intervals, and
    the obtaining of the depth information comprises measuring intensities of reflected light beams formed as the plurality of light beams are reflected by the object and modulated as the reflected light beams pass through a light modulator and extracting a difference between phases of the light emitted by the light source and the reflected light based on the measured intensities.

31. A depth image generating apparatus comprising:
    a light source configured to emit light towards an object so that the light is reflected by the object;
    an optical shutter provided on a path of the light reflected by the object and configured to modulate a waveform of the reflected light by changing a transmissivity of the optical shutter with respect to the reflected light;
    a driver configured to apply a driving voltage to the light source and a driving voltage to the optical shutter;
    a temperature measurer configured to measure a temperature of the optical shutter;
    a controller configured to control the driver based on the temperature measured by the temperature measurer and a distance between the object and the light source; and
    a depth information obtainer configured to generate an image corresponding to the reflected light that passes through the optical shutter, extract a phase difference between a phase of the light emitted by the light source to the object and a phase of the reflected light, and obtain depth information regarding the object based on the phase difference.

* * * * *